Jan. 13, 1931.  W. H. FURNESS  1,788,484
APPARATUS FOR MAKING ARTIFICIAL SILK THREAD
Filed Dec. 12, 1927  4 Sheets-Sheet 2
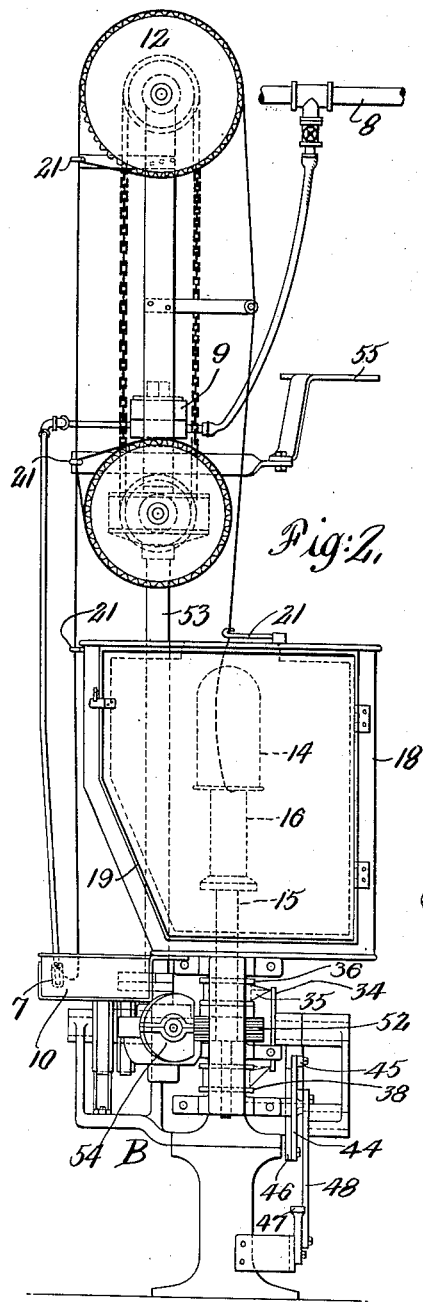
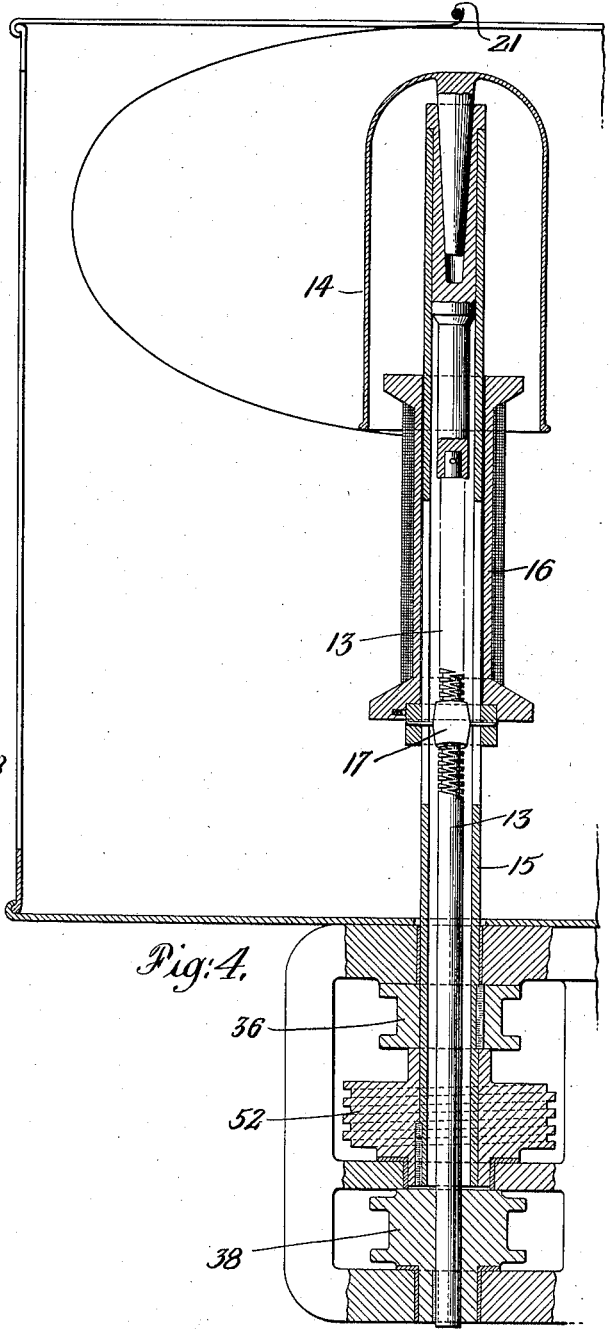
Inventor
William H. Furness
By his Attorneys
Synnestvedt & Lechner

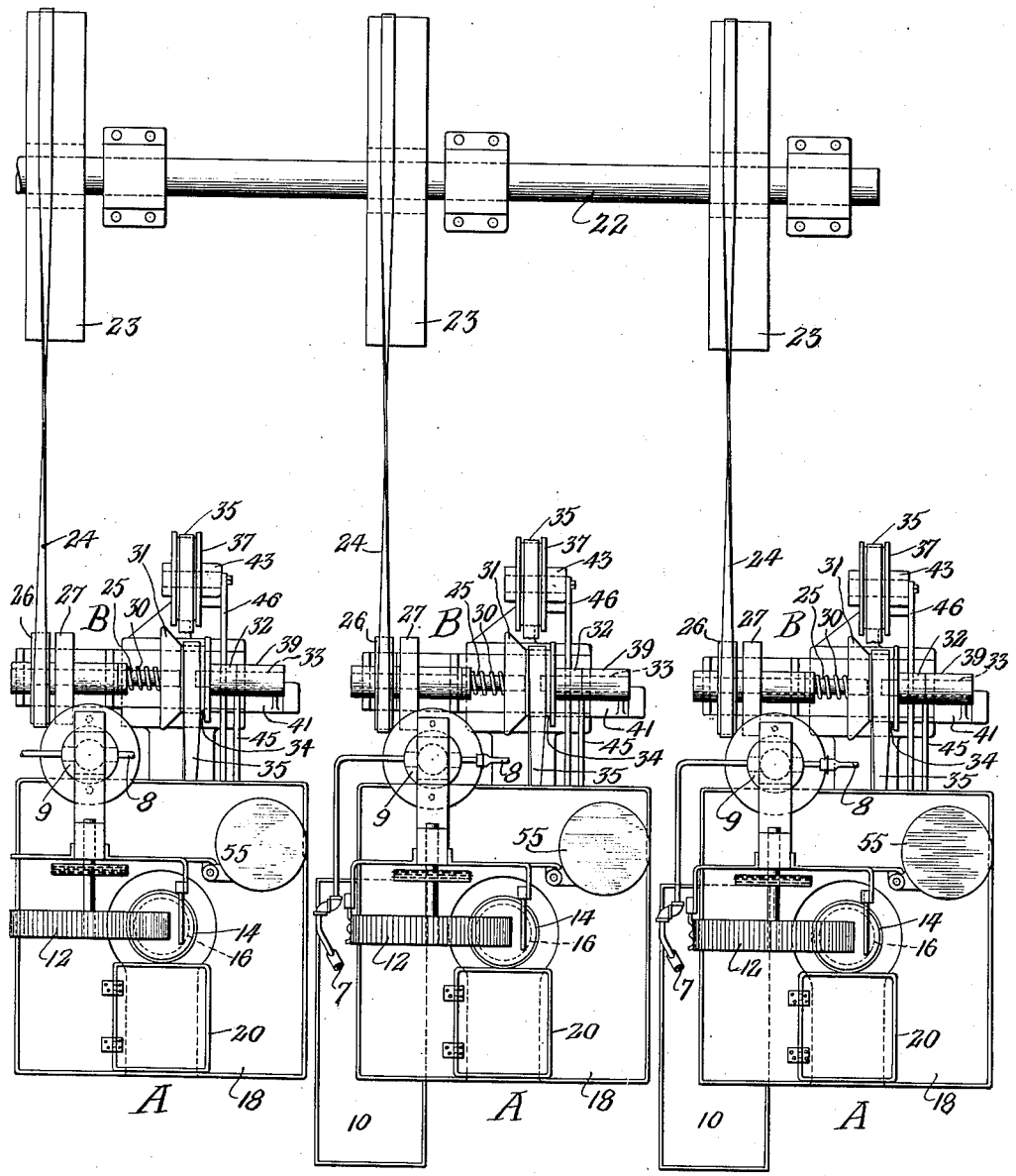
Fig:1.

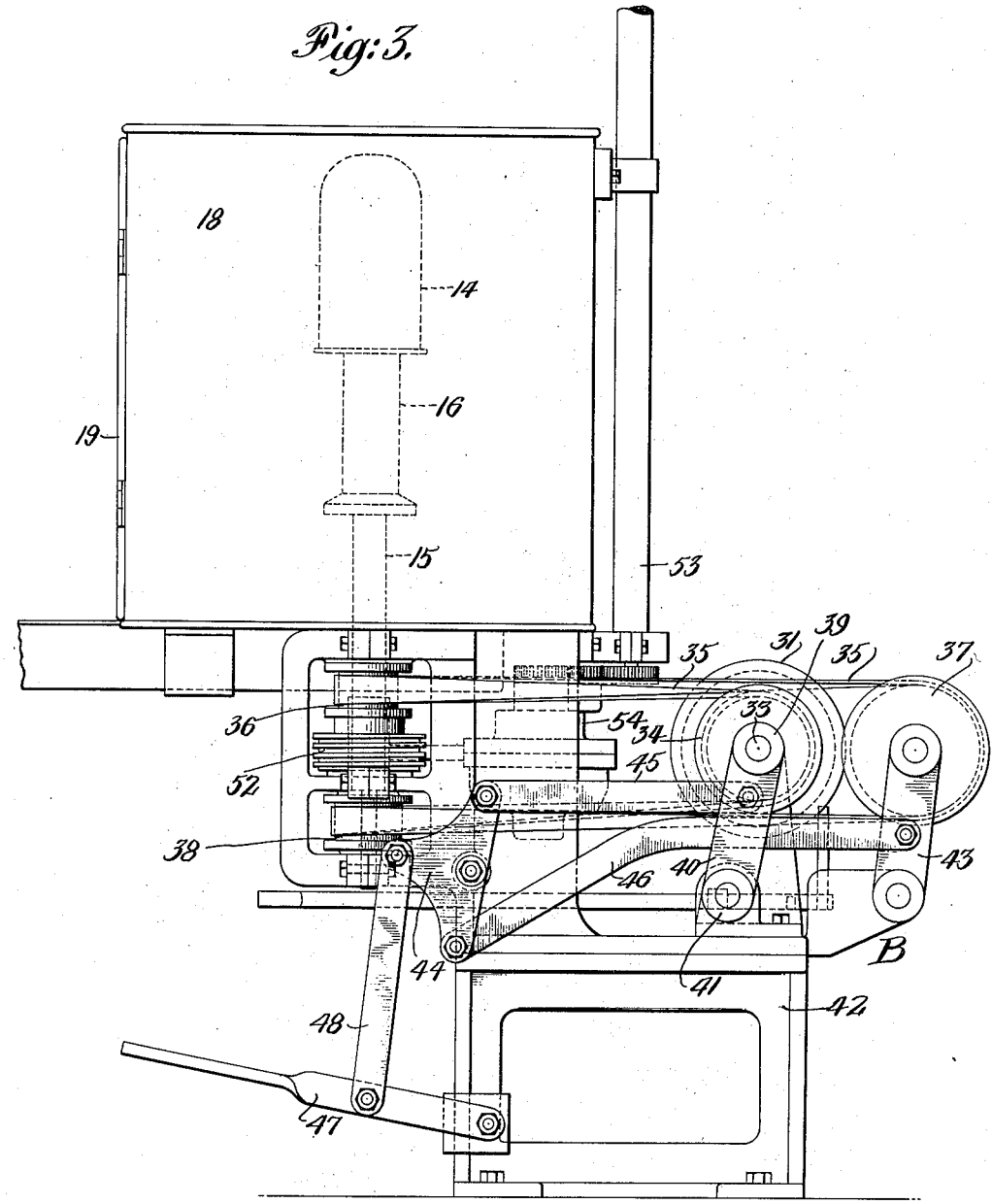

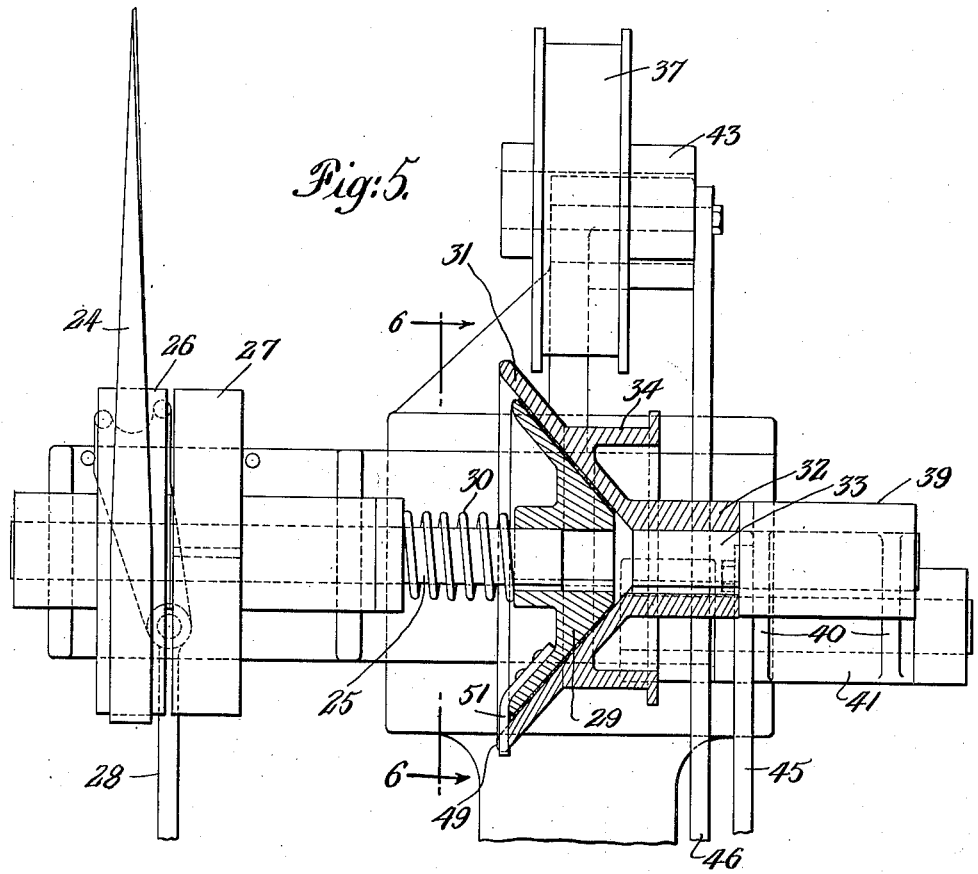
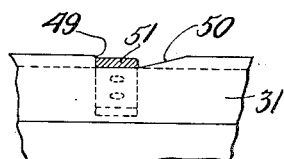
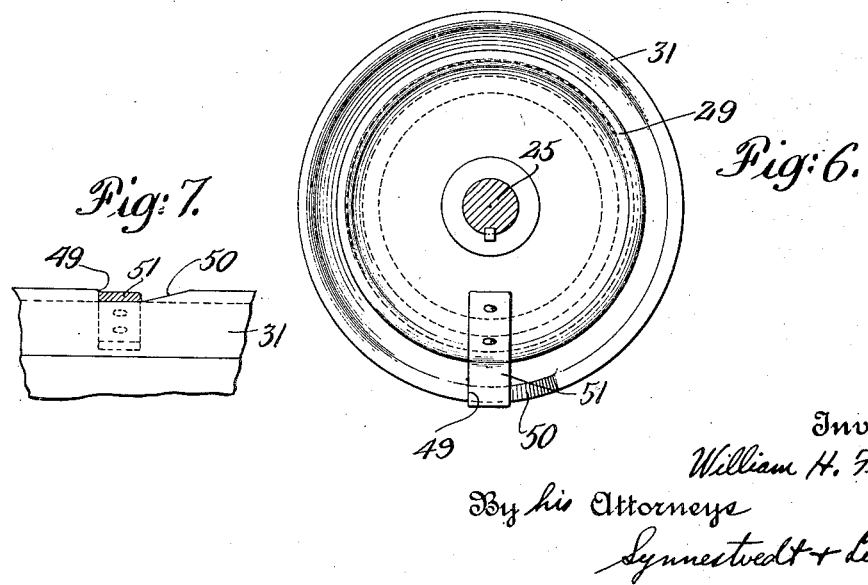

Patented Jan. 13, 1931

1,788,484

UNITED STATES PATENT OFFICE

WILLIAM H. FURNESS, OF NATIONAL PARK, NEW JERSEY, ASSIGNOR TO CELLOCILK COMPANY, OF PHILADELPHIA, PENNSYLVANIA, A CORPORATION OF DELAWARE

APPARATUS FOR MAKING ARTIFICIAL-SILK THREAD

Application filed December 12, 1927. Serial No. 239,402.

This invention relates to improvements in apparatus for making artificial silk thread.

One of the primary objects of the invention is to secure maximum plant production.

More specifically, it is an object of my invention to make it possible to doff a bobbin or spool, or other device, upon which the thread is laid without affecting the operation of other spindles.

It is also an object of my invention to make it possible to doff a spool or bobbin from its spindle without interrupting the formation of the thread.

The foregoing, together with such other objects and advantages as may hereinafter appear, or are incident to my invention, is accomplished by means of a construction which I have illustrated in the preferred form in the accompanying drawings, wherein—

Fig. 1 is a plan view of a battery of spindles illustrating the driving mechanism.

Fig. 2 is a front elevation of a spindle.

Fig. 3 is a side elevation of a portion of a spindle portion on an enlarged scale to more clearly illustrate the driving mechanism.

Fig. 4 is a cross sectional view drawn on an enlarged scale showing the cap twister mechanism and its drive.

Fig. 5 is a partial section and plan view of a portion of the driving mechanism and illustrates certain other specific features thereof.

Fig. 6 is a section taken on the line 6—6 of Fig. 5, and

Fig. 7 is a fragmentary view illustrating a detail of the driving mechanism.

Referring now to Figs. 1 and 2, the reference character A denotes three "spindles" of a battery of spindles forming part or the whole of a plant. Each spindle in the main comprises a spinneret 7 to which a cellulose solution, such, for example, as a cupro-ammonium cellulose solution is supplied from a suitable source of supply 8 through the medium of any suitable form of extrusion pump 9; the precipitating bath 10 in which the solution spun by the spinneret is precipitated in gel form in filaments which subsequently converge to form a thread; the drawing wheels 11 and 12 over which the formed thread is passed; and the cap twister mechanism comprising the spindle 13 which carries the twister cap 14; the spindle 15 which is adapted to carry a spool or bobbin 16, and the nut 17 which imparts reciprocating movement to the spool.

The cap and spool are enclosed in a suitable housing 18 which has a door 19 at the front and a door 20 at the top.

It will be understood that suitable guides 21 for the thread are provided where needed.

The drawing mechanism, the cap twister mechanism, and means for imparting reciprocating movement to the spool form no part of the present invention, and are shown, described and claimed in copending applications Serial No. 239,401, filed December 12, 1927; and Serial No. 239,403, filed December 12, 1927.

Each spindle has its own driving mechanism indicated as a whole by the reference character B, and these are all driven from a common source of power, such as the driving shaft 22. As one means of driving each of the spindles from this driving shaft, I provide a driving pulley 23 and a driving belt 24 for each spindle.

Each spindle driving unit has a shaft 25 carrying an idling pulley 26 and a driving pulley 27, the usual throwover mechanism 28 being provided for shifting the belt 24 from the idler pulley 26 to the pulley 27 to establish driving connection between the shaft 22 and the shaft 25 of the respective spindle (see Fig. 5). The shaft 25 has a driving cone 29 splined thereto, the cone being yieldingly held in forward position by the spring 30. The driving cone 29 nests in the cone 31 to provide a cone friction drive. The cone 31 has a hollow hub 32 into which the pin 33 extends. The cone 31 is provided with a pulley portion 34, and an endless belt 35 passes over this pulley and around the pulley 36 keyed to the spindle 15, thence around the pulley 37 and around the pulley 38, which is keyed to the spindle 13, and thence back to the pulley 34 (see Fig. 3).

The pin 33 has its outer end mounted in the sleeve 39 which is provided with two yoke arms 40 terminating at their lower ends in the sleeve 41 which is pivoted on the framework 42 of the spindle. The pulley 37 is similarly mounted on a pivotal yoke device 43 also supported from the main frame 42. The yoke arms 40 and the yoke device 43 are respectively connected to opposite ends of the three-armed rocking lever 44 by means of links 45 and 46. The third arm of the lever 44 is connected to the treadle 47 by means of the link 48.

The rim of the cone 31 is notched at 49 and is provided with the inclined surface 50. The cone 29 has a shoe portion 51 adapted to fit in the notch.

The operation is as follows: assuming that the shaft 25 is being driven as hereinbefore indicated. The cone 31 is then being driven at the same speed as the cone 29, the shoe portion 51 fitting in the notch 49 so as to provide a positive driving connection between the two cones. The belt 35 which passes over the pulley 34 on the cone 31 is now driving the cap twister spindle 13 through the pulley 38 and is driving the spool spindle 15 through the pulley 36. Rotating with the pulley 36 is a worm wheel 52 which is adapted to drive the shaft 53 through the medium of the intermediate gearing mechanism indicated as a whole by the reference numeral 54. The shaft 53 operates the pump 9 and the drawing wheels 11 and 12. Thus, the belt 24 provided for each spindle drives all of the rotating parts of the spindle.

In order to decrease the speed of operation of the spindle the operator depresses the treadle 47, in consequence of which the cone 31 and its pulley 34 are moved to the left from the position shown in Fig. 3, this movement having the effect of forcing the cone 29 to the left of the position it occupies in Fig. 5, the amount that the cone 29 is moved to the left being dependent upon the extent to which the treadle 47 is depressed. The speed of the cone 31 is correspondingly reduced, it being understood in this connection that as long as the treadle is being held, friction driving engagement between the two cones will be maintained. When the treadle is released, the direct and full speed drive will be established.

When the treadle is depressed and the axis of the cone 31 shifted as described, the pulley 37 is moved to the right from the position it occupies in Fig. 3 in an amount corresponding to the amount of displacement of the cone 31. Thus, the belt 35 is maintained tight.

It will readily be understood from the foregoing that when the speed of the pulley 34 is reduced, the speed of operation of the pump, the drawing mechanism, the cap twister, and the spool, are all simultaneously reduced to what may be termed an idling speed.

At this idling speed, the thread may be broken and the table 55 swung into the line of movement of the thread so that the thread being drawn may collect thereon during the period of doffing, i. e., during the period when the doors are opened to permit the removal of the cap and thereafter of the filled spool, the insertion of a new spool, and the replacing of the cap.

The thread is now picked up, the excess broken off, the table 55 swung out of the way, and the thread is started on the new spool.

Thus, it is not necessary for me to discontinue the formation of the thread when it is necessary to doff any spindle. The reduction in speed, however, is such that the amount of thread formed during the period of doffing is so small that the loss thereof is negligible. Despite the slowing down of operations, the thread is still in the condition such that it may me readily started on the new spool.

In addition to the above, it will be obvious that if, for any reason, it is desired to cut out a spindle, this may be done without affecting the remaining spindles.

I claim:—

1. In artificial silk thread making apparatus, the combination of a spinneret and its pump mechanism, drawing mechanism, cap twister mechanism for laying up the formed thread on a spool, and driving means for said mechanisms including means for reducing the speed of drive to permit of doffing of the spool without interruption in thread formation.

2. In artificial silk thread making apparatus, the combination of a spinneret and its pump mechanism, drawing mechanism, mechanism for laying up the formed thread, and driving means for said mechanisms including means for reducing the speed of drive to permit of doffing without interruption in thread formation, together with means for receiving the thread formed during doffing.

3. In artificial silk thread making apparatus, the combination of a spinneret and its pump mechanism, drawing mechanism, mechanism for laying up the formed thread, and driving means for said mechanisms including means for reducing the speed of drive to permit of doffing without interruption in thread formation, together with means for receiving the thread formed during doffing, which means is movable into and out of the path of movement of the thread.

4. In artificial silk thread making apparatus, a battery of spindles each comprising a spinneret, a drawing and a cap twister mechanism, a main driving means, and a drive transmission intermediate each spindle and the main drive, each drive transmission driving all of said mechanisms on each spindle and each drive transmission being individually controllable to simultaneously vary the speed of operations of said mechanisms of each spindle.

In testimony whereof I have hereunto signed my name.

WILLIAM H. FURNESS.